United States Patent [19]

Lloyd et al.

[11] 4,106,740
[45] Aug. 15, 1978

[54] AIRBORNE VIBRATION ISOLATED SENSOR APPARATUS

[75] Inventors: Wayne B. Lloyd, Baltimore; Dale R. Logan, Columbia, both of Md.

[73] Assignee: Westinghouse Electric Corp., Pittsburgh, Pa.

[21] Appl. No.: 782,278

[22] Filed: Mar. 28, 1977

[51] Int. Cl.² .............................................. F16F 15/04
[52] U.S. Cl. ................... 248/358 R; 248/18
[58] Field of Search .............. 248/358 R, 358 AA, 18, 248/20, 26; 267/160

[56] References Cited

U.S. PATENT DOCUMENTS

| | | | |
|---|---|---|---|
| 3,197,983 | 8/1965 | Ilmer | 248/18 |
| 3,448,951 | 6/1969 | Watkins | 248/18 |
| 3,690,607 | 9/1972 | Mard | 248/358 R |
| 3,823,903 | 7/1974 | Kendall et al. | 248/18 |
| 4,013,170 | 3/1977 | Hutterer | 248/358 |
| 4,019,750 | 4/1977 | Wiegard | 267/160 |

*Primary Examiner*—Robert A. Hafer
*Attorney, Agent, or Firm*—D. F. Straitiff

[57] ABSTRACT

Vibration isolated sensor apparatus with minimized air stream obstruction for external mounting on an aircraft. An elongated multi-gimbaled sensor assembly disposed within a cylindrical pod housing for extension along a longitudinal axis of an aircraft is resiliently supported for vibration isolation by a circumferential array of cantilevered longitudinally-extending leaf springs. By actuation of crank arms at the supported ends of the leaf springs, the direction and extent of such resilient support can be made to match $g$ forces created by maneuvering of the aircraft, thereby maintaining minimal radial-wise spring travel clearance-way and minimal transverse section size.

7 Claims, 5 Drawing Figures

AIRBORNE VIBRATION ISOLATED SENSOR APPARATUS

The invention herein described was made in the course of or under a contract or subcontract thereunder, with the U.S. Department of the Air Force.

BACKGROUND OF THE INVENTION

1. Field of the Invention

Vibration isolated sensor assemblies.

2. Description of the Prior Art

It is heretofore has been proposed in U.S. Patent application Ser. No. 688,496 to W. B. Lloyd, now Pat. No. 4,057,238, filed May 20, 1976 and assigned to the assignee of the present application, to provide a vibration isolating spring support assembly that is adjustable according to g forces on an aircraft to maintain minimal spring deflection clearance-way. Such previous arrangement employs helical springs interconnected between mounted and mounting members via rockable lever means and a fulcrum means adjustable with respect thereto.

SUMMARY OF THE INVENTION

The present invention, in utilizing an array of cantilevered leaf springs, adjustable from their one end, in encirclement of an elongated sensor assembly, affords a compact arrangement suitable for external mounting on an aircraft, in which the aircraft g forces can be adjusted for while maintaining minimal spring clearance-way and light spring forces for maximum vibration isolation.

DESCRIPTION OF THE PREFERRED EMBODIMENT

Figure 1:
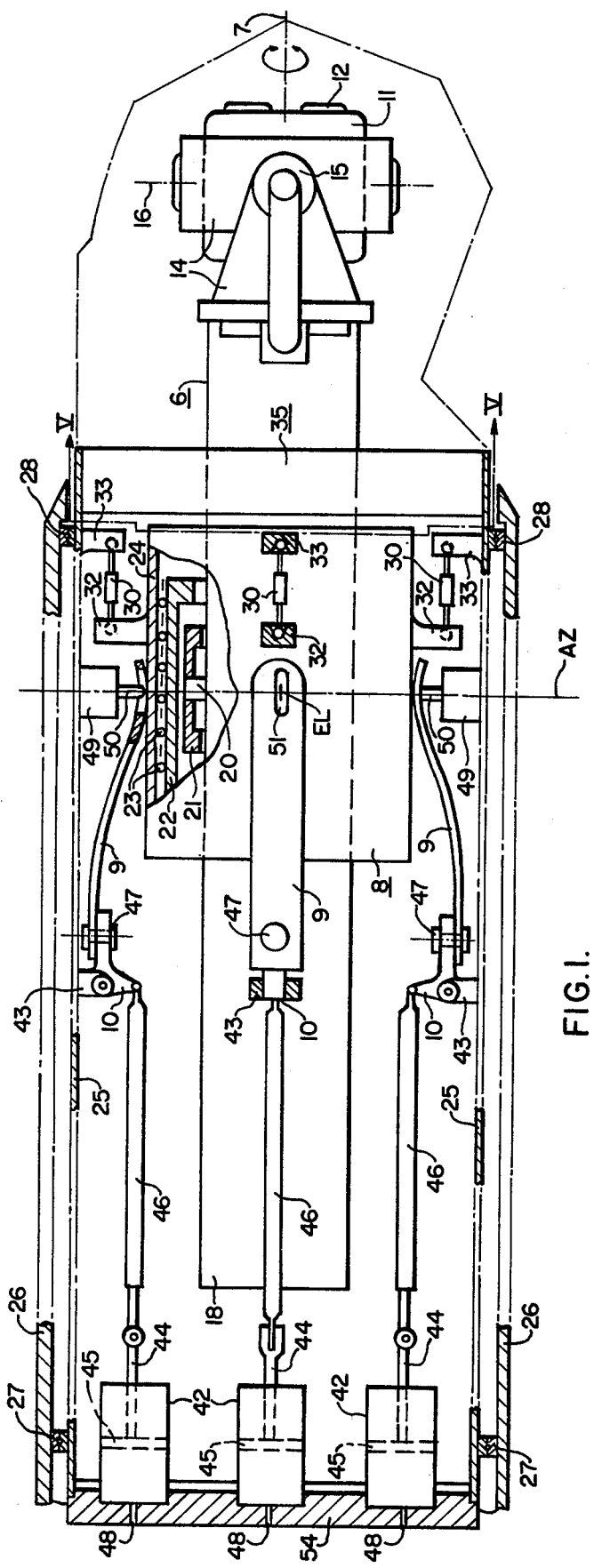
FIG. 1 is a side elevation view, partly in outline and partly in section, of an airborne vibration isolated sensor assembly embodying the invention in its preferred form as presently contemplated.
Figure 3:
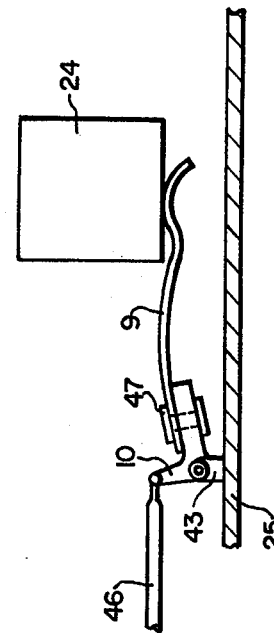
FIGS. 2 and 3 depict schematically several different working positions of one of a plurality of adjustable cantilevered leaf springs employed in the sensor assembly of the present invention.
Figure 2:
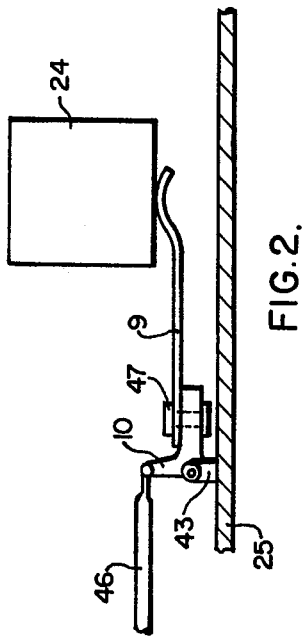

Referring to FIG. 1, the present invention comprises an elongated sensor assembly 6 mounted for extension along a longitudinal axis (or flight path direction) 7 of an aircraft (not shown) through the medium of a gimbal assembly 8 and an array of circumferentially-spaced-apart longitudinally-extending leaf springs 9 cantilevered at one end via crank arms 10.

The sensor assembly typically includes a pickup head 11 having an input 12 for accepting optical or other electromagnetic radiation information and gimbal means 14 enabling directional positioning of the pickup head relative to two mutually perpendicular axes 15 and 16, for elevation and azimuth, position adjustment, respectively. The sensor assembly, per se, does not constitute the invention, and such assembly may be passive, such as used in pickup of infrared radiation, or active, such as of the electro-optical type where a laser beam is projected onto and received from a target for example. The pickup head, via the gimbal means 14 is mounted on the forward end of an elongated housing 18 which may contain signal processing and information handling means (not shown).

The gimbal assembly 8 is affiliated with the elongated sensor mounting structure 18 and provides for a limited degree of freedom for vibratory support movement relative to such housing and pickup head 11 in the elevation, and azimuth rotary directions about axes EL and AZ, respectively, as well as longitudinally in the thrust direction along path 7. Additionally, as will be described in some detail hereinafter, the gimbal means 8 is constrained for limited vibratory movement of support relative to such gimbal means in mutually perpendicular transverse directions, vertical and horizontal, for example.

Gimbal means 8 includes a pin means 20 extending vertically from the sensor mounting structure 18 and journaled in an elevation gimbal 21 to provide freedom for relative vibratory movement between the support and the sensor assembly 6 about the azimuth axis AZ. Gimbal 21 in turn is pivotally supported by a roll-and-thrust gimbal 22 via pin means (not shown) for vibratory freedom about the elevation axis EL perpendicular to azimuth axis AZ. The roll-and-thrust gimbal 22 in turn is supported for vibratory freedom in the thrust direction along axis 7 and in the roll direction also about such axis by an array of ball bearings 23, suitably retained and supported by an outer gimbal housing 24, which is in the form of a hollow cylinder extending equal distances fore and aft of the elevation and azimuth axes EL and AZ. The outer gimbal housing 24 is in turn supported via the leaf springs 9 by an encircling elongated hollow cylindrical member referred to as a roll can 25, which in turn finds support by an encircling cylindrical pod housing 26 with freedom for rotary movement about the longitudinal axis 7 in the roll direction via rotary bearing means 27 and 28. Such roll movement freedom for the roll can 25 provides for pointing movement of the pickup head 11 in the roll direction about axis 7.

The outer gimbal housing 24 is constrained against gross movement radially, or laterally, by a number of bar links 30 spaced apart circumferentially about such housing and extending longitudinally or axially between posts 32 projecting radially outward from the gimbal housing and posts 33 projecting radially inward from the roll can 25. Ends of the bar links are anchored in the posts by ball-and-socket joints that afford the necessary freedom for limited vibratory movement of the roll can 25 and the pod housing 26 in the radial direction relative to the gimbal housing 24 and sensor assembly 6 mounted therein.

Figure 5:
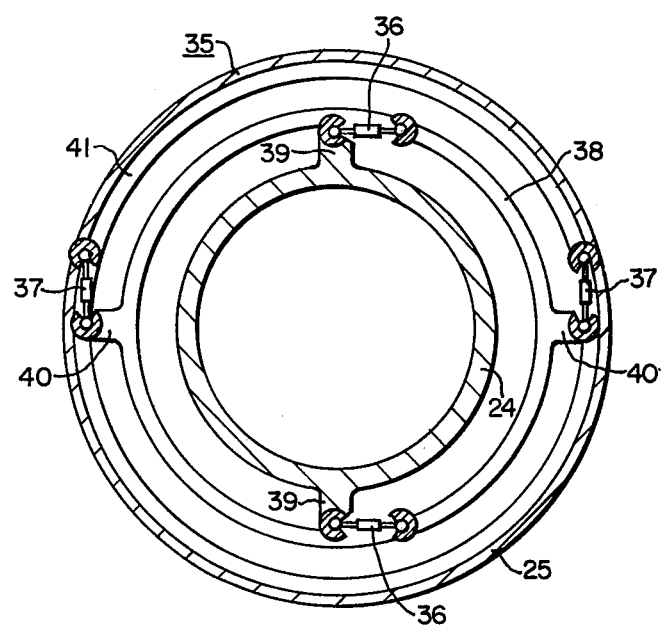
FIG. 5 is a view taken along the line V—V in FIG. 1, depicting schematically an anti-rotational mechanism employed in the assembly of the present invention.

At the same time, the outer gimbal housing 24 is constrained against any movement in the roll direction relative to the roll can 25 by an anti-rotation mechanism 35 that permits of the above limited radialwise vibratory freedom. Such a mechanism is depicted in FIG. 5 and includes two pairs of bar links 36 and 37, similar to bar links 30 in FIG. 1. The one pair 36 extends circumferentially between an inner ring 38 and radial tabs 39 on the gimbal housing 24 to permit limited vibratory movement in the one radial direction, and the other pair of links 37 extend circumferentially between radial tabs 40 on inner ring 38 and sockets in an outer ring 41 which is affixed to the roll can 25. Bar links 37 are arranged to permit the limited vibratory radial movement in a direction perpendicular to that permitted by the links 36.

In accord with a principal feature of the present invention, the gimbal housing 24 is supported by the leaf springs 9, which are relatively weak and yieldable in behalf of isolating transverse or radialwise vibration experienced by the pod housing and roll can from transmission to such housing and to the sensor assembly 6, within. During maneuvering of the aircraft on which the assembly is mounted, vertical or sidewise g forces, either positive or negative are compensated for by adjustment of the bend condition of the leaf springs to cause compensation of the bias forces exerted by the inwardly acting free ends of such springs abutting the exterior of the gimbal housing 24. This is accomplished by operation of a plurality of linear actuators 42 selectively operated according to the direction of g force loading, to effect the bending of the springs by tilting of the crank arms operatively connected to the supported ends of such springs. Pivotal support for such crank arms obtains from brackets 43 mounted on the roll can 25. Piston rods 44 extending from the actuators 42 provide operative connection from actuator pistons 45 to the input ends of the crank arms 10 via push-pull rods 46 extending longitudinally therebetween. Each leaf spring 9 is mounted on the output end of the crank arm by way of a pivot joint 47 that affords freedom for cross travel movement of such supported end relative to the supporting end during certain transverse modes of vibration. The actuators 42 may be operated pneumatically, for example, under dictates of a control system, not shown, responsive to g force information. Selective pressurization of the actuators can occur by way of respective pressure passages in communication with such actuators.

Damping of relative radial vibratory movement between the gimbal housing 24 and the roll can 25 can be obtained by active or passive damper cylinders 49 acting radially inward via the ends of piston rods 50 abutting the gimbal housing; such cylinders being mounted on the roll can 25. Rod 50 ends project through slots 51 in the ends of the leaf springs 9.

By virtue of such adjustment in spring-force-support by the leaf springs to suit varying g force conditions, the springs can be relatively light for vibration isolation yet prevented from bottoming out under varying g forces with minimal radial clearanceway between gimbal housing 24 and roll can 25. Accordingly, the pod housing enclosing the assembly at its exterior can be of minimal transverse dimension in behalf of minimal air friction drag during travel of the pod through the air at the exterior of the aircraft on which it is mounted.

Figure 4:
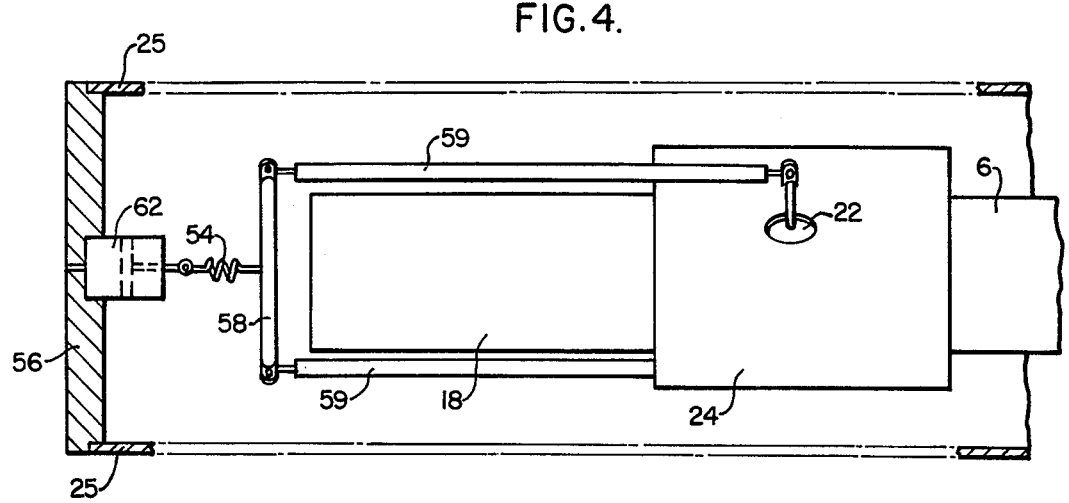
FIG. 4 is a side elevation view of a portion of the sensor assembly of the present invention as embodying a means to accommodate isolation of vibration in the longitudinal or thrust direction of such assembly.

Referring to FIG. 4, freedom for thrust direction vibration along the longitudinal axis 7 can occur by virtue of the ball bearings 23 on which the outer gimbal 22 is mounted. This allows for relative vibratory movement of the pod housing 26, roll can 25, and bar-link-connected gimbal housing 24 in the thrust direction relative to the outer gimbal 22, the elevation gimbal 21, and the sensor assembly 6. An isolator spring and damper in the form of a helical tension spring 54 interconnects an end wall 56 of the roll can 25 with the outer gimbal 22 by way of a cross bar member 58, a pair of push-pull longitudinal rods 59, and oppositely projecting posts 60 projecting from such gimbal 22; only one post being shown. A linear, piston-type actuator 62 is connected in series with the spring 54 to provide for g force adjustment of the bias afforded by such spring in the thrust direction.

Whereas the present invention has been described in particular relation to the drawings attached hereto, it should be understood that other modifications, apart from those shown or suggested herein, may be made within the spirit and scope of this invention.

What is claimed is:

1. Airborn vibration isolated sensor apparatus comprising:
   an elongated hollow enclosure means for external mounting on an aircraft;
   an elongated sensor assembly disposed substantially within said enclosure means with access to information arriving externally;
   a plurality of elongated leaf springs extending longitudinally of said sensor assembly in distribution therearound;
   said leaf springs being supported by said enclosure means and supporting said sensor assembly by creation of yieldable flexural forces;
   linkage means for introducing flexure to said leaf springs selectively; and
   actuator means for operating said linkage means selectively.

2. The apparatus of claim 1, wherein;
   said linkage means includes crank arms at one end of said leaf springs, and push-pull rods interposed operationally between said crank arms and said actuator means.

3. The apparatus of claim 2, wherein;
   said actuator means is in form of a plurality of fluid pressure operated cylinders in general alignment with said push-pull rods in parallel with the longitudinal axis of said enclosure means.

4. The apparatus of claim 1, wherein;
   a gimbal means is interposed between said enclosure means and said sensor assembly to afford freedom for relative movement therebetween in mutually perpendicular directions.

5. The apparatus of claim 4, wherein;
   said gimbal means is mounted in said housing means through the medium of ball bearing means affording freedom for relative movement in roll and logitudinal directions.

6. The apparatus of claim 5, wherein;
   said ball bearing means is supported by said housing means through the medium of a gimbal housing member directly supported by the aforesaid leaf springs.

7. The apparatus of claim 6, wherein;
   kinematic means are included for constraining said gimbal housing member against longitudinal and circumferential movement while affording freedom for a limited degree of lateral movement in mutually transverse directions.

* * * * *